March 10, 1953 F. G. HODSDON 2,630,782
DIAPHRAGM TYPE MILK RELEASER
Filed Sept. 29, 1950 3 Sheets-Sheet 2

Inventor:
Floyd G. Hodsdon
Paul O. Pippel
Atty.

March 10, 1953  F. G. HODSDON  2,630,782
DIAPHRAGM TYPE MILK RELEASER
Filed Sept. 29, 1950  3 Sheets-Sheet 3
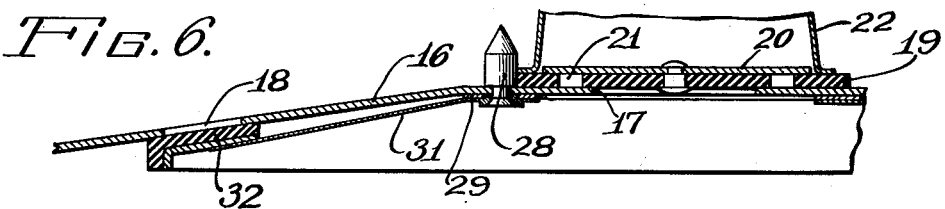
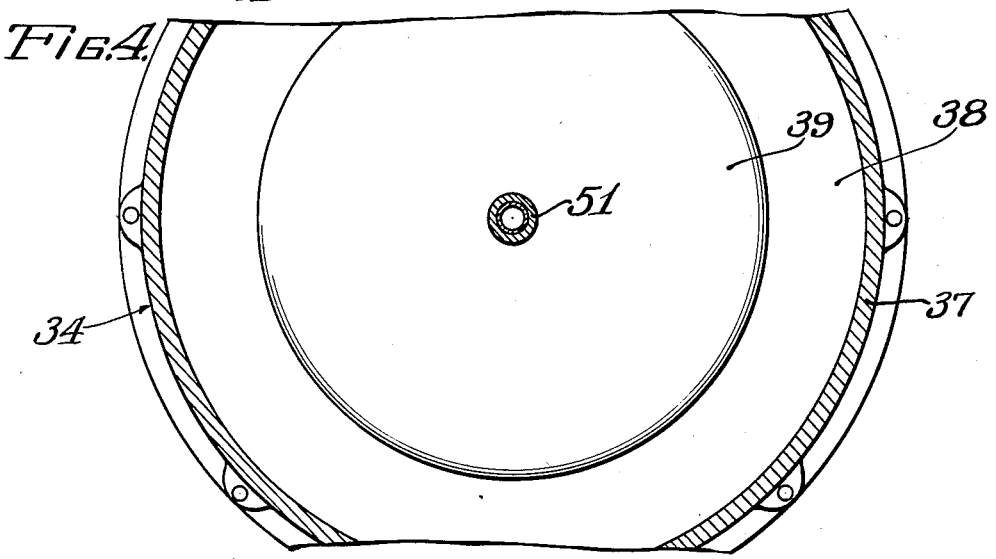
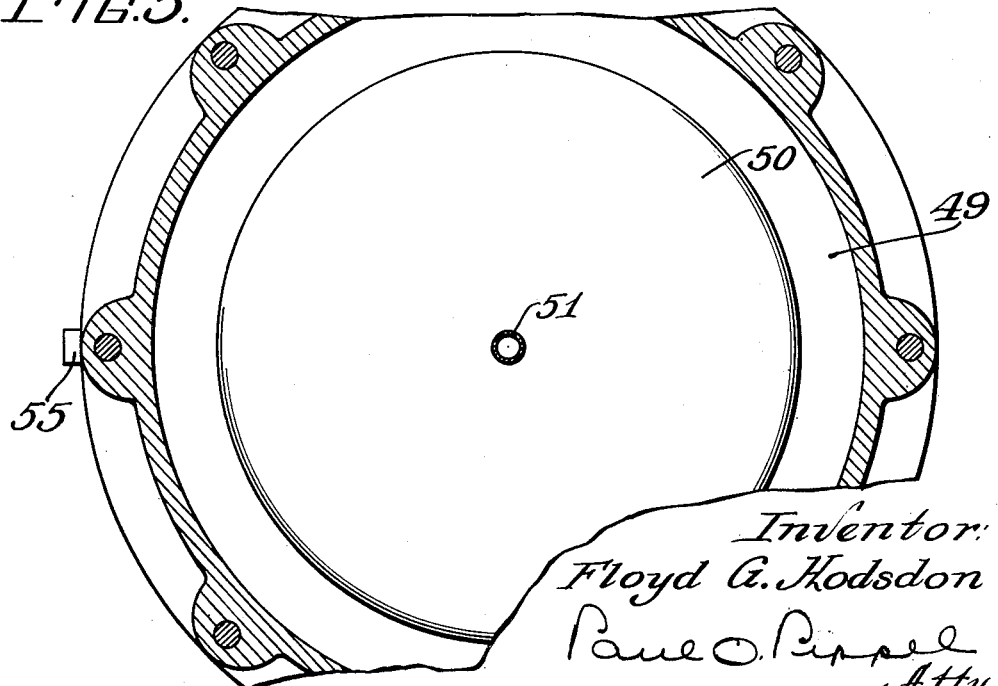
Inventor:
Floyd G. Hodsdon
Paul O. Pippel
Atty.

Patented Mar. 10, 1953

2,630,782

UNITED STATES PATENT OFFICE 2,630,782

DIAPHRAGM TYPE MILK RELEASER

Floyd G. Hodsdon, Milwaukee, Wis., assignor to International Harvester Company, a corporation of New Jersey Application September 29, 1950, Serial No. 187,529

5 Claims. (Cl. 119—14.07)

This invention relates to an improvement in milk releasers and more particularly to a milk releaser operated by a diaphragm structure.

The primary object of this invention is to provide an improved milker releaser, the releaser having provisions wherein the milk may be discharged from a milking system under vacuum, the releaser being operable to elevate the discharged milk to a pipe line at a higher level or altitude than the altitude at which the releaser is positioned.

Still another object is to provide an improved milk releaser having a mechanism for elevating the released milk, the mechanism operating independently of the vacuum system leading to the teat cups of a milking machine.

Still another object is to provide an improved milker releaser actuated by means of a diaphragm structure, the diaphragm structure being arranged for quick attachment or detachment to a milker pail, thereby permitting the releaser to be easily and quickly cleaned after the operation.

A still further object is to provide an improved milker releaser comprising a receiver pail having outlets for the discharge of milk, the releaser also including a diaphragm pump having a casing adapted to be attached to the milker pail, this casing including an upper smaller diaphragm connected by a common shaft at the center to a lower larger diaphragm in direct operative connection with a source of alternating vacuum and atmosphere pulsations.

A still further object is to provide an improved milker releaser having a diaphragm structure for releasing the milk from a vacuum system, the diaphragm structure being constructed to permit the operator to effectively clean the parts after use.

A still further object is the provision of a milker releaser wherein the release of the milk is effected by means of pressure differential between a milk receiving chamber and a diaphragm chamber, the pressure differential being effected by a pair of diaphragms, the vacuum stroke of the diaphragms resulting in the release of the milk and the pressure stroke of the diaphragms resulting in the discharge of milk.

The objects of the invention are achieved by means of a releaser consisting generally of a milk receiver having a milk inlet connection and a vacuum connection. The releaser is provided with a lower wall structure having a centrally disposed opening, this opening being enclosed by tubular conduit which is supported on the wall structure over the opening. The lower wall of the container also is provided with a plurality of milk discharge openings. The release of the milk is effected by means of a diaphragm structure which is adapted to be quickly attached and detached to the lower wall of the container. Two diaphragms are arranged to oscillate in a manner wherein milk is discharged from the container downward to a diaphragm chamber during a certain movement of the diaphragms. Upon a subsequent movement of the diaphragms the milk is discharged upwards from the diaphragm chamber to the tubular conduit and from there the milk is elevated to a pipe line and distributed to its ultimate destination. The lower diaphragm is actuated by an alternating source of vacuum and atmosphere pulsations such as produced by the operation of a conventional pulsator.

Other objects of the invention will become readily apparent from a reading of the specification when taken in connection with the accompanying drawings.

In the drawings:

Fig. 4 is a cross-sectional view through a diaphragm structure, the view being taken substantially along the line 4—4 of Fig. 1.

Fig. 5 is a cross-sectional view through an actuating diaphragm and adjacent structure, the view being taken substantially along the line 5—5 of Fig. 1; and Fig. 6 is an enlarged fragmentary sectional view, in elevation, the view disclosing a pair of valve structures connected to the lower wall of a container forming part of a milk releaser.

Figure 1:
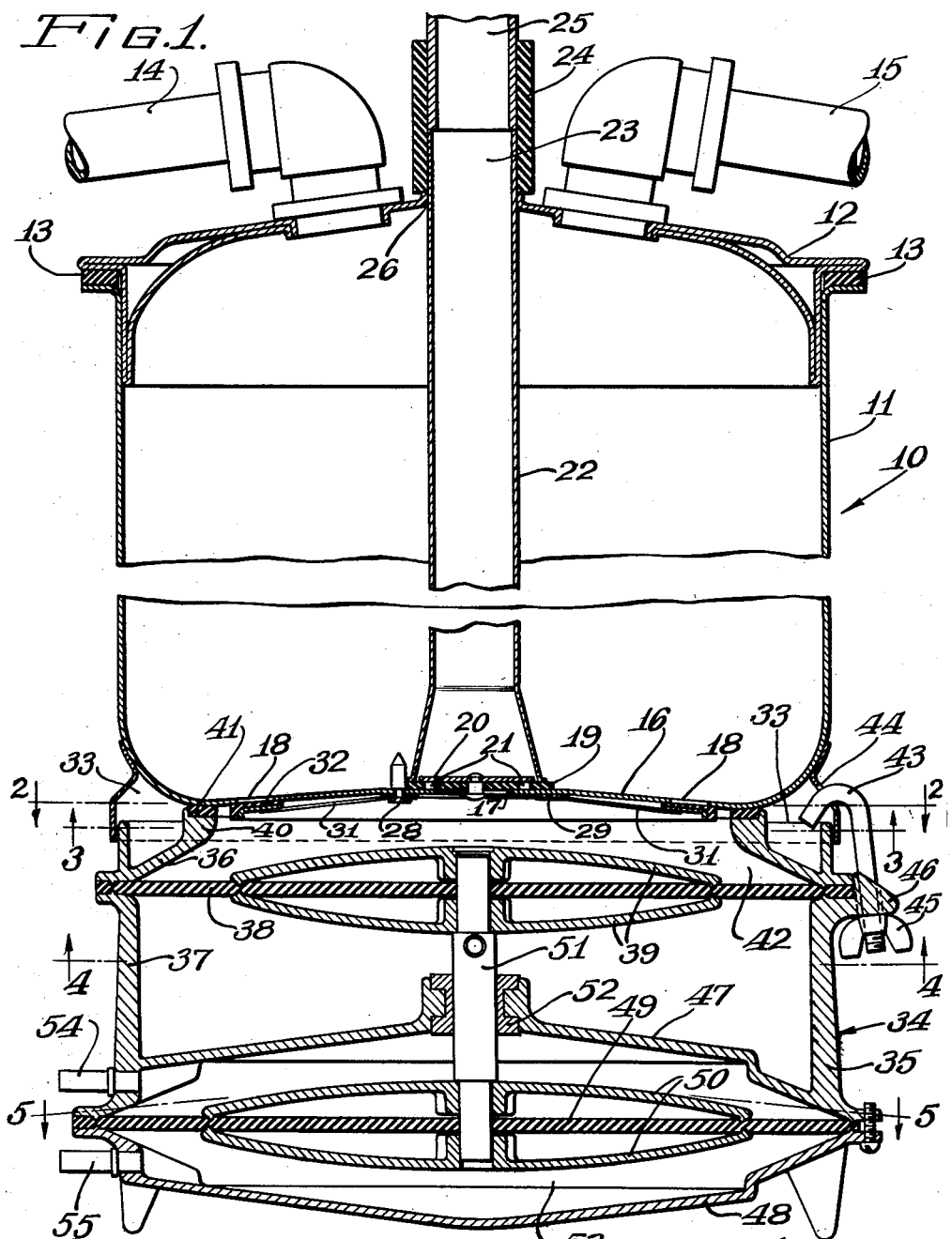
Fig. 1 is a cross-sectional view in elevation through the milker releaser showing a container structure having a diaphragm structure connected thereto.

Referring particularly to Fig. 1, a milk releaser is generally designated by the reference character 10. The milk releaser 10 includes a milk container or receptacle 11, this receptacle being very similar in nature to a type of milk container that is generally utilized in connection with milking machines. The milk receptacle is provided with a cover 12 which fits over the upper end of the upper end of the receptacle 11 and is suitably sealed thereto by means of an annular seal 13. During any vacuum or minus pressure within the receptacle 11 the cover 12 is securely and tightly sealed with respect to said receptacle. The cover 12 is provided with a milk inlet connection 14, this connection being generally connected to a milk line of a milking installation (not shown). The milk inlet connection 14 is thus arranged to provide for the entrance of milk into the container 11. A vacuum connection 15 is also indicated as being connected to the cover 12, this vacuum connection generally being connected to the vacuum line of a pipe line milking system (not shown).

Figure 2:
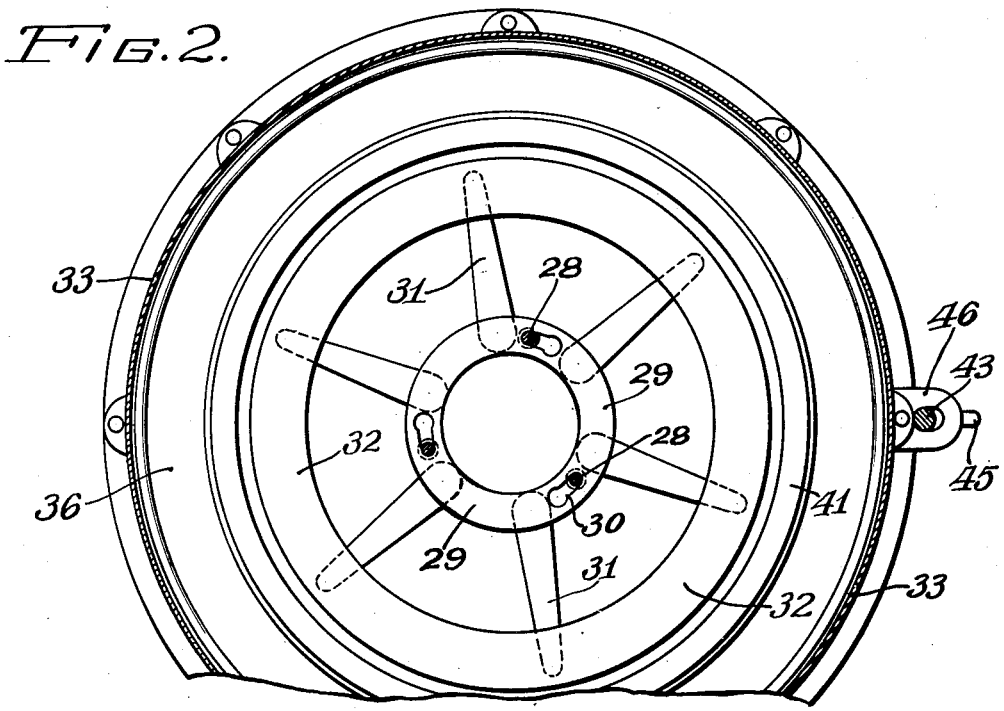
Fig. 2 is a cross-sectional view looking down upon a valve arrangement for a milk releaser, the view being taken substantially on the line 2—2 of Fig. 1.
Figure 3:
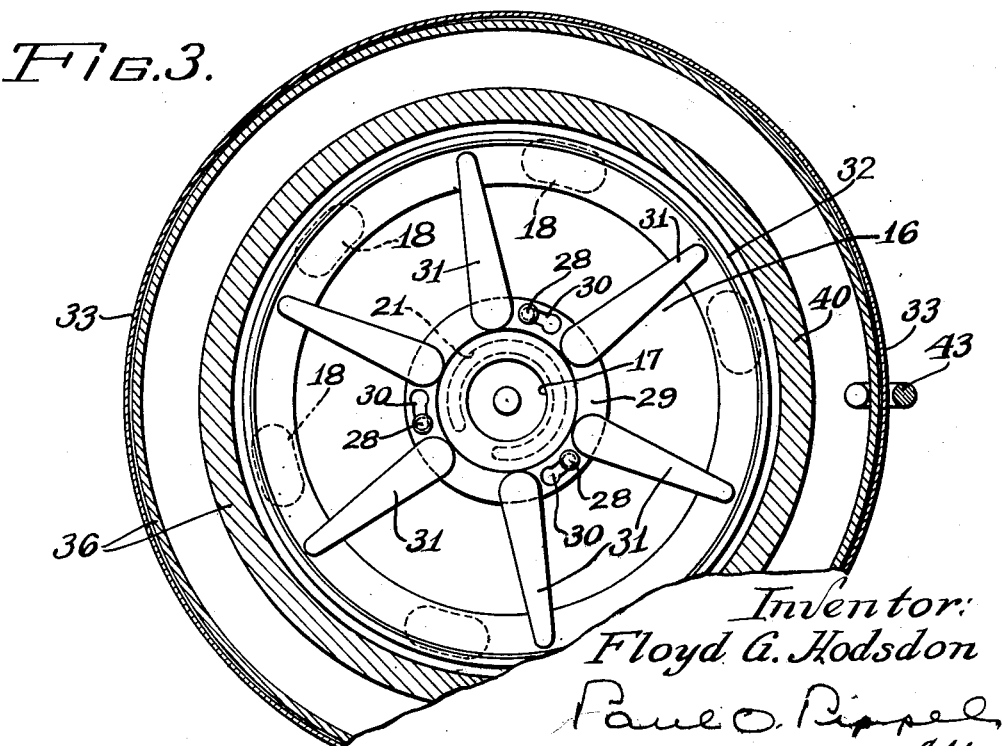
Fig. 3 is a cross-sectional view of the valve structure shown in Fig. 2, the view being taken substantially along line 3—3 of Fig. 1.

The container 11 is provided with a lower or bottom wall 16. The bottom wall 16 is provided with a centrally disposed opening 17. A plurality of openings 18, as best shown in Figs. 1 through 3, are provided in the lower wall 16, these openings 18 being disposed radially with respect to the central opening 17.

As best shown in Figs. 1 and 6, the opening 17 is covered by means of a flexible pad 19 of rubber-like material. The pad has connected to its upper surface a circular metal plate 20, this plate acting as a weight to keep the valve pad 19 in a horizontal position over the opening 17. The valve pad 19 is provided as best shown in Fig. 3 with an arcuate slot 21.

An elongated tube or conduit 22 is disposed within the container 11. The conduit 22 has its lower end supported on top of the flexible pad 19. The tube 22 is provided with an upper open end portion 23, this portion being suitably connected by means of a flexible rubber sleeve 24 to a conduit 25. The conduit 25 may form part of a pipe line system directed toward a reservoir (not shown) adapted to receive the released milk. The tube 22 is suitably held at its upper end by means of an upturned annular bead or collar 26 formed in the cover 12. During assembly the tube 22 is forced downwardly with its lower end engaging the pad 19 in sealing relation, thereby effectively sealing the entrance of the tube 22 from the interior of the receptacle 11.

A plurality of radially disposed rivets 28 are connected in the bottom wall 16. The rivets 28 have their heads suitably spaced from the underneath portion of the bottom wall 16, whereby they are adapted to support an annular metal ring 29. The ring 29 is provided with circumferentially spaced keyhole slots 30, the slots being arranged in a manner wherein the ring 29 may be inserted over the rivets and then rotated to securely fasten the ring 29 to the underneath side of the bottom wall 16. The metal ring 29 supports a plurality of radially extending resilient fingers 31. As best shown in Figs. 2 and 3, the fingers 31 support an annular sealing element 32. The sealing element 32 as best shown in Fig. 1 is positioned over the openings 18, thereby suitably sealing said openings.

The container 11 is provided with a downwardly extending annular flange or skirt 33. A diaphragm structure generally designated by the reference character 34 is disposed below the bottom wall 16. The diaphragm structure 34 consists of a casing 35. The casing 35 is formed of an annular upper part 36 and an annular middle part 37 between which a diaphragm 38 is ridgedly secured in a suitable manner. The diaphragm 38 consists of a flexible membrane which is suitably fastened between a pair of dished diaphragm plates 39. The upper part 36 is provided with an upwardly extending annular flange 40. The flange 40 provides a seat for an annular seal 41. The flange 40 supports the seal 41 and the seal 41 engages the underneath side of the bottom wall 16 in sealing relation to form a diaphragm chamber 42. The sealing relation of the seal 41 with respect to the lower wall 16 is securely maintained by means of a plurality of hooks 43, only one of which is shown. The hooks 43 may suitably engage openings 44 disposed circumferentially on the flange 33. Wing nuts 45 are threaded onto the hooks 43, these nuts being arranged so that they may engage projecting portions 46 of the middle part 37. It can thus be seen that by suitably tightening the wing nuts 45 the casing 35 may be securely fastened to the underneath side of the bottom 16.

The casing 35 is provided with a partition 47. A lower part 48 is vertically spaced from the partition 47. A flexible diaphragm 49 is suitably connected between the lower part 48 and the middle part 37, this flexible diaphragm also consisting of a flexible membrane. The diaphragm 49 is suitably connected between a pair of dished plates 50. A connecting rod 51 suitably connects the diaphragm 38, the dished plates 39, the diaphragm 49 and the dished plates 50. The connecting rod 51 may be reciprocated in a bearing member 52. The diaphragm 49 is adapted to oscillate within a diaphragm chamber 53. As shown in Fig. 1 the chamber 53 has connected thereto conduit connections 54 and 55. The connections 54 and 55 are disposed on opposite sides of the diaphragm 49, these connections being adapted to connect to a source of alternating vacuum atmosphere pulsations (not shown). Such a source may consist of a pulsating mechanism as shown in applicant's Patent 1,844,853, dated February 9, 1932.

*The operation*

The milk releaser 10 may be seated on the floor of a milking pit or may be seated on the ground floor of a milking establishment. The pipe lines for the milking system may be arranged above the milk releaser, one of the pipe lines (not shown) being suitably connected to the milk inlet connection 14. It is desired to release the milk from the pipe line under vacuum without disturbing the vacuum within said line. The connection 15 is connected to a source of vacuum and thus the container 11 is also under a vacuum. Milk therefore flows to the container through the inlet connection 14. The diaphragm structure 34 is suitably connected to the underneath side of the wall 16 of the container 11 in the manner shown in Fig. 1. The connections 54 and 55 are alternately connected with a source of vacuum and air pulsations and thus opposite sides of the diaphragm 49 are subjected to alternating atmosphere and vacuum pressures. This operates to cause oscillation of the diaphragm 49, this movement being transmitted to the diaphragm 38 by means of the connecting rod 51.

In the position shown in Fig. 1 the diaphragm 38 is midway of its stroke, thus subjecting the chamber 42 to a vacuum depression. The pressure differential between the chamber 42 and the container 11 is such that the sealing element 32 is drawn away from the openings 18 and milk is discharged through these openings to the diaphragm chamber 42. The flexible valve pad 19 is at this point arranged in a manner wherein the arcuate opening 21 is sealed and no communication between the chamber 42 and the tube 22 exists. As the diaphragm 49 is actuated to push the diaphragm 38 upwardly the sealing element 32 springs back, covering the openings 18, and as the diaphragm 38 is pushed to its extreme upper position the valve element 19 swings upwardly, wherein the opening 21 is exposed, thus permitting liquid to be discharged through the opening 21 past the plate 20 and up into the tube 22. As the diaphragm is again moved downwardly the hinged rubber valve drops down again in position in the manner shown in Fig. 1 wherein the tube 22 is sealed from the chamber 42.

The oscillation of the diaphragms continues in this manner whereby the chamber 42 is alternately filled with milk and the milk is discharged through the tube 22. During each up-stroke of the diaphragm 38 the milk is forced upwardly in the tube 22 and it can readily be seen that by this manner the milk can be elevated to any practical height desired. The diaphragms 38 and 49 are controlled by means of a pulsating mechanism. This mechanism is divorced from the closed system or pipe line in which the milk and vacuum is normally carried and thus the released milk is elevated by means of a system which is operated by vacuum completely independent of the pipe line normally carrying the milk.

In a closed milking system wherein the pipe line carries both vacuum and milk, the milk can be elevated by the vacuum which operates the closed system but this use of the vacuum in elevating milk causes a drop in the vacuum at the milking machine and at the teat cups. This is very undesirable since a constant vacuum should be maintained at all times. In the present mechanism the milk is elevated by a vacuum source that can be completely independent of the vacuum source operating the milking system. In fact the diaphragms may be oscillated by any independent power means. Thus the vacuum within the milk pipe line is not disturbed during the release and elevation of the milk since the vacuum which draws the milk from the cow does not play any part in the elevation of the milk.

The structure disclosed is particularly novel. The tube 22 effectively supports the lower wall 16 of the milker releaser. This tube acts to discharge the milk and also functions to reinforce the lower wall 16, this reinforcement being desirable since the interior of the receptacle 11 is subjected to considerable minus pressures. When the releasing operation has been accomplished the operator can quickly and effectively clean the parts of the releaser. The diaphragm structure 34 can quickly be removed and the valves can be quickly disassembled for cleaning. The actuating diaphragm 49 is completely separated from the chamber 42 and thus only the parts adjacent the chamber 42 need be cleaned. In other works, the actuating diaphragm is so completely sealed off from the chamber 42 so that contamination of this chamber by the actuating mechanism is highly improbable.

Applicant has provided a novel milker releaser which permits the elevation of released milk to any desired degree without disturbing the vacuum system normally operating a milking system. The diaphragm structure is so arranged that it may be readily removed from the milker pail or container structure and thus the cleaning and washing of the parts is greatly facilitated.

It must be understood that only a preferred embodiment of the invention has been shown and that changes and modifications may be made which do not depart from the spirit of the invention as disclosed nor the scope thereof as defined in the appended claims.

What is claimed is:

1. A milk releaser comprising an upright receptacle having a lower wall, a milk inlet connection and a vacuum connection on said receptacle, an upright tube substantially centrally disposed within said receptacle, said tube having an open portion opening outwardly of the receptacle, means connecting said tube to the bottom of the lower wall whereby the interior of the tube is sealed from the interior of said receptacle, said bottom wall including a first opening adapted to communicate with said tube, a first valve over said opening, said first valve being adapted to open inwardly toward the interior of the tube, said lower wall further including a plurality of second openings, a second valve resiliently supported over said second openings, said second valve being adapted to open outwardly of said receptacle, means for actuating said valves comprising a diaphragm structure including a casing, an upright annular flange at the upper portion of said casing, a first diaphragm supported adjacent the upper end of said casing, means for detachably securing said casing to said receptacle with said flange seated against the underneath side of said lower wall in sealing relation to provide with said first diaphragm a first chamber adapted to communicate with said first and second openings, a second chamber axially spaced from said first chamber, a second diaphragm in said second chamber, a reciprocable connecting member extending into the first and second chambers, means connecting the connecting member to the first and second diaphragms whereby oscillatory movement of the second diaphragm is imparted to said first diaphragm, and means for oscillating said second diaphragm including first and second conduit connections in communication with the second chamber on opposite sides of the second diaphragm, said conduit connections being connectable to a source of alternating vacuum and atmosphere pulsations whereupon vacuum and atmosphere is alternately directed to the second chamber on opposite sides of the second diaphragm for oscillating the same and for imparting oscillatory movement to the first diaphragm, whereupon movement of the first diaphragm in one direction the second valve is moved away from the second opening and milk is delivered from the receptacle to said first chamber and whereupon movement of said second diaphragm in a second direction said first valve is moved from the first opening to permit the discharge of milk from the first chamber to said upright tube.

2. A milk releaser comprising a container having a milk inlet connection and a vacuum connection, a lower wall on said container, said wall having a first centrally disposed opening, and a plurality of openings disposed radially outwardly of said central opening, a tube disposed within the container, said tube having its upper end opening outwardly of the container and its lower end disposed over the centrally disposed opening, means for sealing the interior of said tube from the interior of said container, a first valve within said tube disposed over the central opening, said valve being arranged to open inwardly with respect to said opening, a second valve connected to the lower wall, said second valve including a plurality of resilient spring fingers extending radially outwardly, an annular sealing element carried by said fingers, said sealing element being disposed over said radially disposed openings, a diaphragm structure disposed below the container, said diaphragm structure including a casing, an upright annular flange projecting upwardly from said casing, a first diaphragm supported for oscillation adjacent the annular flange, means for detachably securing said casing to the container with the flange seated against the underneath side of the lower wall in sealing relation to provide a first diaphragm chamber, a second diaphragm chamber axially spaced with respect to said first diaphragm chamber, a second diaphragm positioned for oscillation within said second diaphragm chamber, means connecting said first and second diaphragms whereby oscillating movement of said second diaphragm is imparted to said first diaphragm, conduit means connected to said casing, said conduit means being connectable with a source of alternating vacuum and atmosphere for alternately supplying vacuum and atmosphere to the second chamber on opposite sides of the second diaphragm, whereupon movement of said diaphragms in one direction the second valve is moved to provide for the inflow of fluid from the container to said first chamber, and whereupon movement of said diaphragms in a second direction said valve is opened and fluid from said second chamber is discharged to said tube.

3. A milk releaser comprising a container having a milk inlet connection and a vacuum connection, a lower wall on said container, said wall having a first centrally disposed opening, and a plurality of openings disposed radially outwardly of said central opening, a tube disposed within the container, said tube having its upper end opening outwardly of the container and its lower end disposed over the centrally disposed opening, means for sealing the interior of said tube from the interior of said container, a first valve within said tube disposed over the central opening, said valve being arranged to open inwardly with respect to said opening, a second valve connected to the lower wall, said second valve including a plurality of resilient spring fingers extending radially outwardly, an annular sealing element carried by said fingers, said sealing element being disposed over said radially disposed openings, a diaphragm structure disposed below the container, said diaphragm structure including a casing, an upright annular flange projecting upwardly from said casing, a diaphragm supported for oscillation adjacent the annular flange, means for detachably securing said casing to the container with the flange seated against the underneath side of the lower wall in sealing relation to provide a diaphragm chamber, and actuating means connected to the diaphragm for moving said diaphragm whereupon movement in one direction the second valve is moved to provide for the inflow of fluid from the container to said first chamber, and whereupon movement of said diaphragm in a second direction said first valve is opened and fluid from said second chamber is discharged to said tube.

4. A milk releaser as defined in claim 3, wherein said annular flange is provided with an annular sealing element disposed between the flange and the lower wall of the container, the actuating means for moving said diaphragm including conduit members adapted to be connected to a source of alternating vacuum and atmosphere pulsations.

5. A milk releaser comprising a container having a milk inlet connection and a vacuum connection, a lower wall on said container, a discharge tube supported on the lower wall of the container, said wall having a first discharge opening adapted to communicate with said tube, a first valve member positioned to open and close said first discharge opening, said wall having a second discharge opening, a second valve member positioned over said second discharge opening, a diaphragm structure disposed below the lower wall, said structure including a casing, first and second diaphragm chambers within said casing, the first discharge opening being adapted to communicate with the first diaphragm chamber, first and second diaphragms respectively positioned for oscillation within said first and second chambers, said first diaphragm chamber being positioned to receive milk through the second discharge opening from the container during the open position of said second valve, a connecting rod connecting the first and second diaphragms, said connecting rod being movable upon oscillation of said second diaphragm for oscillating said first diaphragm, means for oscillating said second diaphragm to oscillate said first diaphragm including conduits disposed on opposite sides of the second diaphragm and in communication with the second chamber, said conduits being arranged to connect to a source of alternating vacuum and air pulsation whereupon air and vacuum is alternately directed to the second chamber on opposite sides of the second diaphragm, said second diaphragm being movable to a first position whereupon the second valve moves away from the second opening and milk is discharged from the container into the first chamber, said first diaphragm being movable to a second position whereupon milk is discharged from the first chamber through the first opening past the first valve and outwardly through said discharge tube.

FLOYD G. HODSDON.

REFERENCES CITED

The following references are of record in the file of this patent:

UNITED STATES PATENTS

| Number | Name | Date |
|---|---|---|
| 2,458,779 | Hodsdon | Jan. 11, 1949 |
| 2,488,725 | Hodsdon | Nov. 22, 1949 |